United States Patent [19]

Watson

[11] 4,169,487
[45] Oct. 2, 1979

[54] GLOBE-VALVE LOCKING APPARATUS FOR VALVE LAPPING

[76] Inventor: Robert L. Watson, 1605 Morningside Dr., Merritt Island, Fla. 32952

[21] Appl. No.: 807,891

[22] Filed: Jun. 20, 1977

[51] Int. Cl.² .............................................. F16K 29/00
[52] U.S. Cl. ................................. 137/243.4; 403/362; 51/241 VS
[58] Field of Search ....................... 403/362, 373, 376; 137/243, 243.4; 29/157.1; 51/241 VS

[56] References Cited

U.S. PATENT DOCUMENTS

| Re. 6,528 | 7/1875 | Powell | 137/243.4 |
| 1,570,042 | 1/1926 | Clay | 51/241 VS |
| 2,793,484 | 5/1957 | McNeill et al. | 403/362 |

Primary Examiner—Robert L. Spruill
Assistant Examiner—Roscoe V. Parker
Attorney, Agent, or Firm—Brown & Martin

[57] ABSTRACT

A valve lapping tool for lapping globe type valves comprises a clamp device for clamping the valve disc to the valve stem and includes an annular body member having radially directed clamping members for clamping engagement with the valve stem and axially directed clamping members for clamping engagement with the valve disc for preventing relative rotation of the disc and stem during the lapping operation. The lapping operation is carried out on valves such as globe valves by loosening the valve bonnet to permit rotation of the valve stem without axial movement of the valve disc, the clamping of the disc to the valve stem by means of a clamping device, application of lapping compound to the valve face and seat and positioning of the valve in the valve seat and rotation of the valve stem in alternate directions until the valve is properly seated.

2 Claims, 5 Drawing Figures

GLOBE-VALVE LOCKING APPARATUS FOR VALVE LAPPING

BACKGROUND OF THE INVENTION

The present invention relates to valve system maintenance and manufacture and pertains particularly to a method and apparatus for reseating globe type valves.

A great many globe type valves are used in industry and commerce for controlling the flow of fluids in fluid systems. Such valves of the globe type includes a valve body having a through passage including a portion surrounded by a valve seat with a valve member normally termed a disc axially movable on a rotatable and axially movable stem into and out of a seating engagement with the valve seat to control flow of fluid through the valve. Fluids flowing through such a valve corrode, pit, and wear away the valve disc seating surface and the valve seat. This permits the valve to leak fluids by the valve and becomes wasteful and in many cases hazardous.

Such valves can frequently be reconditioned by regrinding the valve seat and the valve disc seating surface. The surfaces are then lapped to provide a close fitting seal of the mating surfaces.

Frequently only a lapping operation is needed in order to reseat the valve and its seat in order to make the valve correctly function again. Such operation in the prior art technique is generally carried out by a welding the valve disc to the valve stem to prevent relative rotation thereof. Thereafter a grinding or lapping compound is placed on the valve seat or seating surface and the rotation of the valve stem and disc is carried out until a proper mating of these surfaces is obtained. After the lapping or mating of the surfaces is obtained the valve stem and disc is then removed and the welding is ground off to permit the valve disc to rotate relative to the valve stem.

The problem with this approach is that an expert welder is needed to provide the welding and grinding facilities are needed in order to grind the weld off. Frequently such valve discs and stems are damaged beyond repair by either the welding or by the subsequent grinding of the weld from the valve and stem.

Accordingly, it is desirable that a simple quick and easy method and apparatus be available for quickly and conveniently securing valve discs against relative rotation for proper lapping of the valve seats.

SUMMARY AND OBJECTS OF THE INVENTION

Accordingly it is the primary object of the present invention to overcome the above problems of the prior art.

Another object of the present invention is to provide an improved method of lapping valve seats.

A further object of the present invention is to provide an improved tool for securing valve discs to valve stems to prevent relative rotation therebetween for lapping valve seats.

In accordance with the primary aspect of the present invention a clamping apparatus is provided for clamping a valve disc to a valve stem to prevent relative rotation therebetween during lapping of the valve seats. Lapping of the valve seats are carried by clamping of the valve disc to the valve stem to prevent relative rotation thereof and thereafter applying a lapping compound to the valve seats and applying a relative rotation of the discs with the seat until proper lapping or seating of the valve occurs.

BRIEF DESCRIPTION OF THE DRAWING

The above and other objects and advantages of the present invention will become apparent from the following description when read in conjunction with the drawings, wherein.

DETAILED DESCRIPTION OF A PREFERRED EMBODIMENT

Figure 1:
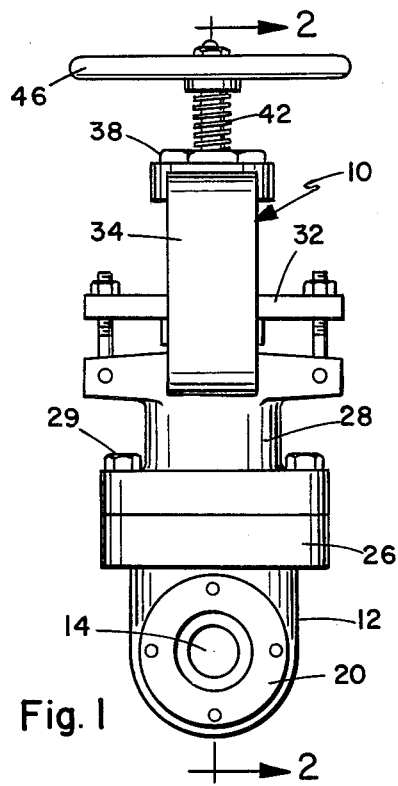
FIG. 1 is an end elevational view of a typical globe valve in which the invention is used.
Figure 2:
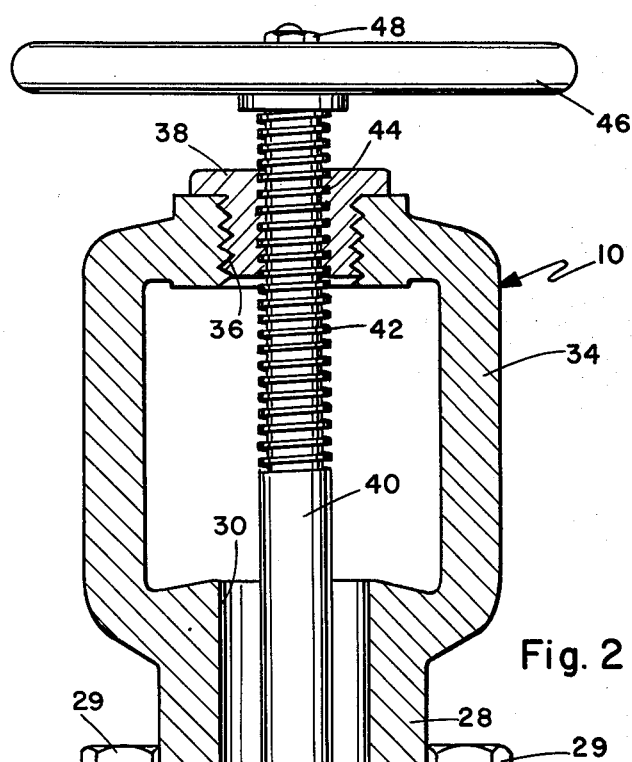
FIG. 2 is an enlarged sectional view as taken on line 2—2 of FIG. 1, but with portions removed for the lapping operation.

Turning now to the drawing, there is illustrated in FIG. 1 a typical globe valve designated generally by the numeral 10 in which or on which the present invention is used and carried out.

The globe valve comprises a valve body 12 having a through passage defined by a pair of passages 14 and 16 separated or interrupted by a valving bore or port 17 surrounded by a generally conically shaped valve seat 18. The valve body includes flanges or the like 20 and 22 for securing the body to conduits within a fluid circuit. The valve body includes an upwardly directed bore 24 that communicates with passages 14, 16 and is substantially coaxial with the valve seat 18. A flange 26 surrounds the bore 24 for securing a bonnet 28 in place on the valve body.

Figure 4:
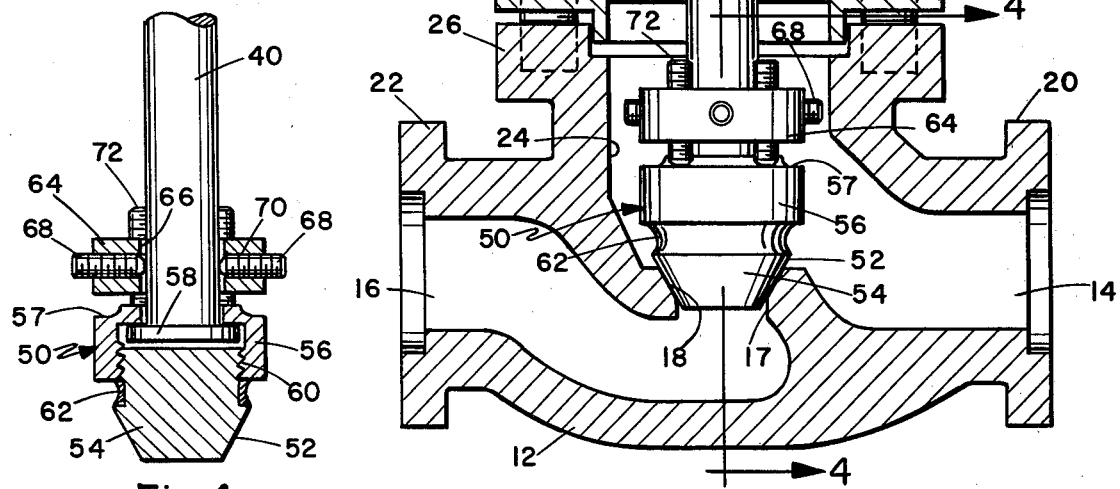
FIG. 4 is a sectional view taken on line 4—4 of FIG. 2, showing the attachment of the disc locking clamp.

The bonnet 28 includes a packing bore 30 into which packing is placed and is biased into position by a packing gland 32. A yoke 34 integral with the bonnet 28 extends upward therefrom and includes a bore 36 at the upper end thereof for threadably receiving a nut 38. A valve stem 40 includes threads 42 at the upper end thereof for threadably engaging threads 44 formed in the nut 38. A valve wheel 46 is mounted on the upper end of shaft 40 and secured thereto such as by means of a nut 48 for rotation of the shaft 40. A valve disc 50 is rotatably mounted on the lower end of shaft 40 and includes a valve seat engaging surface 52 for cooperatively engaging the valve seat 18 for closing the valve and preventing communication of fluids between the passages 14 and 16. The valve disc 50 as best seen in FIG. 4 includes a lower body member 54 having a collar 56 secured thereto and engaging a flange 58 on the lower end of shaft 40. The collar 56 is suitably secured to the valve disc body 54 such as by threads 60 and welding 62.

In normal operation the valve is operated by rotation of hand wheel 46 for moving the valve stem 40 upward and downward toward the valve seat 18 for moving the valve face 52 into and out of engagement with the valve seat 18. This operation controls communication between the passages 14 and 16.

Figure 3:
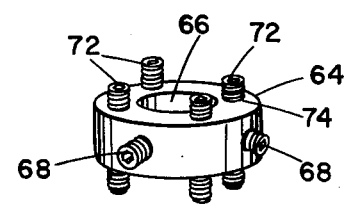
FIG. 3 is a perspective view of the disc locking clamp.

Turning now to FIG. 3, a clamping apparatus or device in accordance with the present invention is disclosed. This clamping apparatus comprises an annular body member 64 having a central through bore 66 for receiving the valve stem 40. A plurality of radially directed gripping means in the form of set screws 68 are threadably engaging into radial bores 70 formed in the body 64. Rotation of the set screws 68 by a suitable wrench or the like biases the forward end of the screws into tight engagement with the valve stem 40, as best seen in FIG. 4. This grips the valve stem 40. A plurality of axially extending gripping members in the form of machine or set screws 72, each having a head and an opposite gripping end, are likewise threaded into similar bores 74 formed axially through the body 64 between the screws 68. After the radially directed screws 68 have been set into position gripping the stem 40, the axial screws 72 are then threaded downward into gripping engagement with the upper surface 57 of the valve disc. This clamp apparatus secures the valve stem 40 and valve disc 50 against relative rotation and tilting.

In carrying out the method of the present invention, the bonnet 28 is removed from the valve body 12 by removal of bolts 29. The valve wheel and nuts are removed and the stem 40 is turned clockwise until completely screwed through the bushing. The stem is then pulled through the bonnet and the packing and packing gland removed. A clamping assembly as disclosed in FIG. 3 is selected and the screws 68 and 72 are backed off from their extended positions. The clamping apparatus is then slid onto the stem 40 resting on top of disc 50. The set screws 68 are then tightened into gripping engagement with the valve stem 40, and the set screws 72 are then tightened into engagement with the top surface 57 of the disc 50. The disc is then blued to the seat while in the lock position to insure that the disc is perpendicular to the stem. The bluing is then removed from the disc and seat. The stem is now placed back into the valve bonnet and screwed back into the stem bushing which is in its original position until the clamping apparatus rests against the bottom of the bonnet. The hand wheel 46 and nut 38 are now replaced into position.

A desired lapping compound is now placed on the disc surface 52 and seat 18 and the bonnet placed back in position on the valve body, and the hand wheel is now turned clockwise till the bonnet starts to lift off the body. The hand wheel is then rotated clockwise for an additional one-quarter turn. The spotting in or lapping procedure is now begun, using loosened bonnet bolts 29 as guide pins for the bonnet and allowing the bonnet to slide up and down during alternate quarter clockwise and counter clockwise rotations of wheel 46, while exerting enough pressure on the disc valve surface 52 and seat 18 to complete the lapping in procedure. The clamp 64 is periodically checked at regular intervals to insure against relative rotation or slippage thereof. When the seating or spotting in is complete the clamp is then removed and the valve reassembled.

Figure 5:
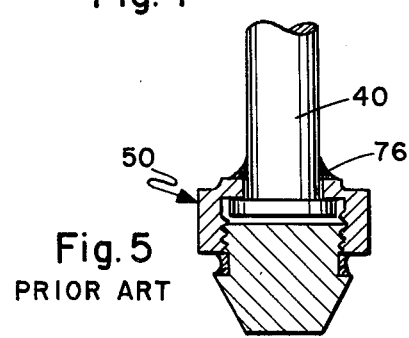
FIG. 5 is a similar sectional view but showing the prior art method of securing the disc.

The above described technique of the present invention is more rapid and convenient than the prior art technique such as illustrated in FIG. 5. In the art, in place of the clamp as above described, a weld 76 is applied to a valve stem 40 and disc 50. This holds these elements against relative rotation during the lapping or spotting in procedures. Thereafter, the stem and disc are removed from the valve and the welding 76 ground away such that relative rotation is again permitted between the disc 50 and stem 40.

While the applicant's invention has been illustrated and described by means of a specific embodiment, it is to be understood that numerous changes and modifications may be made therein without departing from the spirit and scope of the invention as defined in the appended claims.

Having described my invention, I now claim:

1. A valve disc to stem locking tool adapted for use in combination with a globe valve having a valve disc rotatably mounted on the end of a valve stem for locking the valve disc and stem together, said tool comprising:

an annular body member for encircling the stem of a valve and sized to fit within the valve housing,
   a plurality of screws adjustably mounted in radially extending bores in said body member for adjustably engaging and gripping said valve stem, and
   a plurality of screws each having a head and an opposite gripping end adjustably mounted in said body member in a plurality of bores disposed around and extending parallel to the axis of said body member and having said gripping end extending from said body member and disposed for adjustably engaging and gripping a valve disc mounted on the valve stem.

2. The stem locking tool of claim 1, wherein the outer diameter of said body member is no greater than the outer diameter of said valve disc.

* * * * *